United States Patent [19]

Kobayashi et al.

[11] Patent Number: 4,803,660
[45] Date of Patent: Feb. 7, 1989

[54] OPTICAL RECORDING MEDIUM

[75] Inventors: Tadashi Kobayashi, Chiba; Katsumi Suzuki, Tokyo; Naomasa Nakamura, Kanagawa, all of Japan

[73] Assignee: Kabushiki Kaisha Toshiba, Kawasaki, Japan

[21] Appl. No.: 18,282

[22] Filed: Feb. 24, 1987

[30] Foreign Application Priority Data

Feb. 28, 1986 [JP] Japan ................................. 61-41681
Mar. 24, 1986 [JP] Japan ................................. 61-63936
Mar. 24, 1986 [JP] Japan ................................. 61-63937

[51] Int. Cl.$^4$ ............................................. G11C 13/00
[52] U.S. Cl. ................................... 365/113; 365/106; 365/126; 369/284
[58] Field of Search ............... 365/113, 119, 126, 106; 369/100, 125–126, 13, 284; 346/135.1, 137; 430/19

[56] References Cited

U.S. PATENT DOCUMENTS 3,530,441  9/1970  Ovshinsky ............................ 365/113
3,696,344 10/1972  Feinleib et al. ...................... 365/127
3,971,874  7/1976  Ohta et al. ............................ 428/432

FOREIGN PATENT DOCUMENTS 0158804 10/1985  European Pat. Off. ............ 365/113

Primary Examiner—Stuart N. Hecker
Assistant Examiner—Alfonso Garcia
Attorney, Agent, or Firm—Foley & Lardner, Schwartz, Jeffery, Schwaab, Mack, Blumenthal & Evans

[57] ABSTRACT

In an optical memory of phase transition type such that information is recorded or erased by reversibly changing the phase of a thin recording film between equilibrium phase and non-equilibrium phase in response to a laser beam, the memory is formed with a recording film comprising as the main component an intermetallic compound with a melting point between 300° to 800° C. in accordance with a binary target co-sputtering technique. Since the phase transition temperature of the recording film is higher than room temperatures, the recorded film can stably be kept in non-equilibrium phase state for a long time. Further, since the melting point thereof is lower than 800° C., it is possible to record or erase information in or from the medium in response to a relatively small power laser beam.

5 Claims, 4 Drawing Sheets

OPTICAL RECORDING MEDIUM

BACKGROUND OF THE INVENTION

1. Field of the Invention

The present invention relates to an optical memory through which information can be recorded, reproduced, and erased on the basis of phase transition of the memory caused by irradiating a laser beam or the like, and more specifically to an optical memory which can maintain recorded information under stable condition for a long term.

2. Description of the Prior Art

As optical memories through which information can be recorded, reproduced and erased, magneto-optical mediums and phase transition mediums have been well known.

In the phase transition type optical memories, information is recorded and erased on the basis of reversible phase transition in crystal structure of the memory which is caused by irradiating a laser beam.

For instance, the recording and erasing are effected by the utilization of change in crystal structure between a crystalline state and a non-crystalline state (referred to as amorphous state) or between two crystalline states. That is, when a laser beam is irradiated upon a recording film to quickly heat the film and then quench it, phase transition is effected from an equilibrium phase to a non-equilibrium phase to record information. On the other hand, when the laser beam is irradiated upon the recording film to heat it and then cool it slowly, the non-equilibrium phase is returned to the equilibrium phase to erase the recorded information. Further, the recorded information can be reproduced by irradiating a laser beam upon the film to detect the change in reflectivity and/or transmittance between the non-equilibrium phase area at which information is recorded and the equilibrium phase area at which no information is recorded. Here, the non-equilibrium phase implies a non-crystal structure or a metastable phase crystal structure.

As the above optical memories of phase transition type, conventionally, chalcogenide base semiconductors such as Te, Ge or the like have been used.

In the prior art optical memories of phase transition type, however, since the crystallization temperature of pure Te lies at near room temperatures (about 10° C.), after a laser beam including recording information has been irradiated to change the phase of a pure Te film from the equilibrium phase to the non-equilibrium phase for information recording, there exists a problem in that the non-equilibrium phase state returns to the equilibrium phase state due to a change with the passage of time and thereby the recorded information is erased naturally. On the other hand, where Ge is adopted for the memory, since a Ge film is chemically unstable, the Ge film is readily eroded within the atmosphere, and therefore it is impossible to keep information stably recorded thereon.

As described above, since the prior art optical memories adopt a chalcogenide base semiconductor as the recording thin film, there exists a problem in that it is impossible to maintain a stable recording state for a long time.

SUMMARY OF THE INVENTION

With these problems in mind, therefore, it is the primary object of the present invention to provide an optical memory which can stably maintain the recorded non-equilibrium phase state for a long term without recorded information being erased, that is, without being subjected to a harmful influence due to a change with the passage of time.

To achieve the above-mentioned object, the optical memory according to the present invention is formed with a recording layer supported on a substrate and including an intermetallic compound with a melting point between 300° to 800 °C. capable of undergoing phase-changing between equilibrium phase and non-equilibrium phase when exposed to light.

The reason why the above melting point (300° to 800° C.) is important is as follows: The non-equilibrium phase is a state obtained when a liquid is quenched. In order that the non-equilibrium phase exists stably at room temperatures, the transition temperature should be higher than room temperatures. In general, it is known that the crystallization temperature of amorphous is a little higher than a half to two-thirds ($\frac{1}{2}$ to $\frac{2}{3}$) of the melting point or the liquid phase temperature of a substance when expressed by absolute temperature. Therefore, it is preferable that the melting point of the intermetallic compound is beyond 300° C. in order that information is stably kept recorded in an amorphous state of non-equilibrium phase at room temperatures for a long term.

In addition, in the optical memory, since it is necessary that information can be recorded or erased by an optical beam (laser beam) with about 5 to 20 mw output power, it is preferable that the melting point of the intermetallic compound is lower than 800° C.

In the first aspect of the present invention, the intermetallic compound is a normal valency compound selected from the group consisting of AuSn, AuIn$_2$, InSb, BiTe, SnAs, CaSb, and GeTe from the melting point of view.

In the second aspect of there present invention, the intermetallic compound has a size factor compound selected from the group consisting of AuPb$_2$, PdGa$_5$, KPb$_2$, Au$_2$Pb, KBi$_2$, MgZn$_2$, Mg$_2$Ba, Au$_2$Bi, Mg$_2$Sr, Mg$_2$Ca and MnSn$_2$ for the same reason.

In the third aspect of the present invention, the intermetallic compound has an electron compound selected from the group consisting of MgT, LiPb, CuGa$_2$, Cu$_5$Cd$_8$, MgHg and AuZn.

In the above description, the intermetallic compound has an intermediate phase compound A$_m$B$_n$ including pure metals A and B. The recording layer formed by the intermetallic compound is changed in phase from the equilibrium phase to the non-equilibrium phase to record information thereon when heated by a laser beam and then quenched, and vice versa for erasing information recorded thereon when heated by a laser beam and then slowly cooled. The recorded information can be read on the basis of the change in reflectivity and/or transmittance between equilibrium phase and non-equilibrium phase.

To form an intermetallic compound thin film medium according to the present invention, a two-target co-sputtering method is adopted in particular. Further, the intermetallic thin film is sandwiched by two transparent protection films on a plastic substrate, and further covered by a hardened UV resin film.

BRIEF DESCRIPTION OF THE DRAWINGS

The features and advantages of the optical memory according to the present invention will be more clearly appreciated from the following description taken in conjunction with the accompanying drawings in which.

DETAILED DESCRIPTION OF THE PREFERRED EMBODIMENTS

Figure 1:
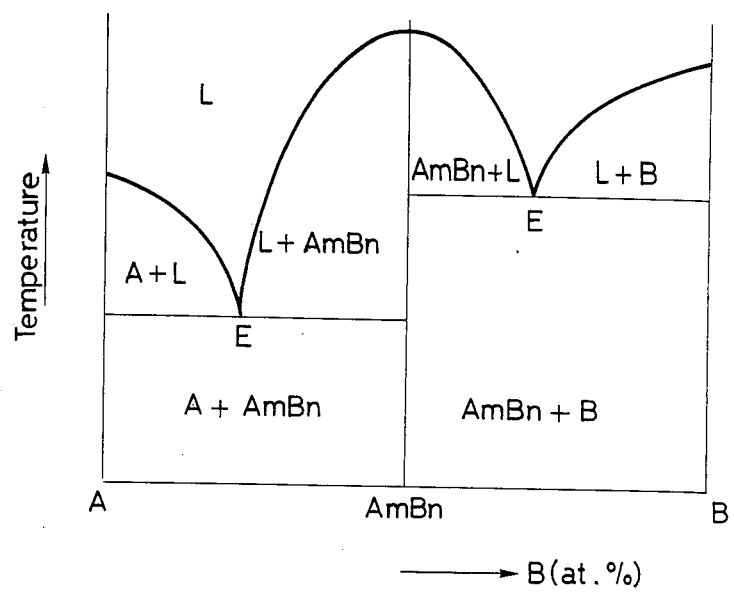
FIG. 1 is a graphical representation showing a typical equilibrium diagram of a binary alloy (A and B) obtained when no solid solution range is included.

To facilitate understanding of the present invention, a reference will first be made to intermetallic compounds.

Alloys are classified as the case where random substitutional solid solution is formed, the case where ordered substitutional solid solution is formed and the case where intermetallic compound is formed, in dependence upon change in internal energy due to two different kinds of atoms A and B. When atoms A and B are easily bonded to each other, the internal energy decreases; however, when atoms A and B are repelled from each other, the internal energy increases. These conditions are dependent upon the valency and the radius of atoms.

In the intermetallic compounds, the numbers of atoms of two different component elements constituting an alloy are kept maintained at a constant integer ratio, and each atom of each component element is located at a peculiar position within a crystal lattice.

On the other hand, in binary alloys obtained by mixing two metals, there often develops an intermediate phase having a crystal structure different from those of the component metals A and B, within a determined composition range. This intermediate phase exists in the vicinity of a composition represented by $A_mB_n$ (m, n: positive integers). Therefore, alloys represented by chemical formulae $A_mB_n$ are formed with peculiar crystal structures, being referred to as intermetallic compounds. The way two different atoms A and B are bonded in the intermetallic compounds relates in combination complicatedly to ionic bonding, homopolar bonding, metal bonding, etc., and the bonding conditions range from the state of strong ionic crystal property to strong metallic property. However, the intermetallic compounds can roughly be divided into three categories of (1) normal valency compounds, (2) size factor compound, and (3) electron compounds, although there exist no definite bounderies between these and many compounds belong to the intermediate ranges therebetween. The above three kinds of intermetallic compounds will be described in further detail hereinbelow.

(1) Normal valency compounds:

These compounds undergo the influence of the valency of each component atom as an important factor. The compounds include the ones of a strong ionic bonding property or a strong homopoler bonding property such as electrochemical compounds. The intermetallic compounds of a strong valency effect can be classified into NaCl type, reverse $CaF_2$ type, $CaF_2$ type, Zinc blende type, Wurtzite type and NiAs type on the basis of the crystal structure.

Although there are a great number of intermetallic compounds of normal valency type, compounds having a melting point from 300° to 800° C. can be selected as listed below.

| Normal valency Compound | Melting Point (°C.) | Crystal Structure |
| --- | --- | --- |
| AuSn | About 418 | NiAs Type |
| $AuIn_2$ | About 540 | $CaF_2$ Type |
| InSb | About 530 | Zinc blende Type |
| BiTe | About 570 | Nacl Type |
| SnAs | About 605 | Nacl Type |
| CaSb | About 706 | Zinc blende Type |
| GeTe | About 700 | Nacl Type |

As already described under SUMMARY OF THE INVENTION, in order to allow the amorphous state of non-equilibrium phase in intermetallic compounds to exist stably at room temperature, since the crystallization temperature ($\frac{1}{2}$ to $\frac{2}{3}$ of the melting point in absolute temperature) should be higher than room temperatures, the lower limit of the melting point is determined as 300° C. On the other hand, the upper limit thereof is determined as 800° C. under the considerations of the practical laser beam output power.

(2) Size factor compounds:

These compounds undergo the influence of the ratio of atomic radii of two different component atoms. These compounds can be classified into Laves phase type, $CuAl_2$ type in crystal lattice, and interstitial compounds.

The Laves phase type compounds have a crystal structure in which the ratio of atomic radii of two component atoms is 1.255, and can further be divided into three ($MgCu_2$, $MgZn_2$ and $MgNi_2$) type from the crystal lattice structural standpoint.

The $CuAl_2$ type compounds have no specific restriction between two component atoms in relative locations on the periodic table, and the ratio of atomic radii of the different component atoms ranges over a relatively wide range.

The interstitial compounds have such a structure that non-metallic atoms such as H, N, C or the like having a small atomic radius enter lattice gaps of a transition metal.

The intermetallic compounds of size factor type are compounds obtained when non-metallic atoms having a small electron radium such as H, N or C are infiltrated into and solid-soluted in the lattic gaps of a transition metal. The intermetallic compound of size factor type having a melting point from 300° to 800° C. can be selected as listed below.

| Size factor Compound | Melting Point (°C.) | Crystal Structure |
| --- | --- | --- |
| $AuPb_2$ | About 300 | $CuAl_2$ Type |
| $PbGa_5$ | About 460 | $CuAl_2$ Type |
| $KPb_2$ | About 480 | Laves Phase |
| $Au_2Pb$ | About 570 | Laves Phase |
| $KBi_2$ | About 553 | Laves Phase |
| $MgZn_2$ | About 580 | Laves Phase |

-continued

| Size factor Compound | Melting Point (°C.) | Crystal Structure |
| --- | --- | --- |
| $Mg_2Ba$ | About 603 | Laves Phase |
| $Au_2Bi$ | About 650 | Laves Phase |
| $Mg_2Sr$ | About 675 | Laves Phase |
| $Mg_2Ca$ | About 714 | Laves Phase |
| $MnSn_2$ | About 700 | $CuAl_2$ Type |

(3) Electron compounds:

These compounds have metallic properties and often involve solid solution ranges over a relatively wide range.

The bonding strength of these compounds is strong in particular between two metals among the ordinary alloys. In many kinds of alloys, an intermediate phase with a fixed crystal structure appears at predetermined valence electron concentration of about 3/2, 21/13 and 7/4. The above intermediate phases are referred to as electron compound phases. The electron compound phase is not a compound of an integer atomic concentration ratio stoichiometrically, but rather an intermediate solid solution phase which provides a crystal structure having a minimum energy of the entire valence electrons.

The intermetallic compounds of electron compound type having a melting point from 300° to 800° C. can be selected as listed below.

| Electron Compound | Melting Point (°C.) | Valence electron concentration |
| --- | --- | --- |
| MgTl | About 360 | 3/2 |
| LiPb | About 482 | 3/2 |
| $CuGa_2$ | About 530 | 21/13 |
| $Cu_5Cd_8$ | About 563 | 21/13 |
| MgHg | About 627 | 3/2 |
| AuZn | About 720 | 3/2 |

As described above, the intermetallic compounds having a melting point from 300° C. to 800° C. can be changed into an non-equilibrium phase state by irradiating a light beam thereupon to heat and quench it for information recording. Further, since the crystallization temperature thereof lies beyond room temperatures, information recorded in the non-equilibrium phase state is stably kept maintained for a long term. Furthermore, these intermetallic compounds are proof against oxidation so that the film will not readily deteriorate. This is because since the bonding strength between metals is strong and therefore the intermetallic compounds are stable.

A higher speed is required to erase information by changing the non-equilibrium phase state to the equilibrium phase state. In the intermetallic compounds, since the phase transition from the amorphous to the crystalline can be attained when the atoms move within a short range, the crystallization speed is extremely high as compared with the ordinary alloy composition.

In more detail, in the case of alloys of eutectic compositions which are known as having an amorphous forming property, since these alloys have a mixed crystal structure between two solid solutions or between solid solution and intermetallic compound, when crystallized, the crystallization occurs at each of different phases and develops two-phase separation. Owing to this two-phase separation, atoms should more over a long range whenever the amorphous state changes to the crystalline state. In addition, since the crystallization is effected through two steps, the speed is slow. In contrast with this, in the intermetallic compounds, since no phase separation occurs and therefore the crystallization is effected at one step when atoms move within a short range, the crystallization speed is extremely high. Therefore, it is possible to erase the recorded information at a high speed by changing the amorphous state to the crystalline state in dependence upon a laser beam pulse. To erase the recorded information, the intermetallic compound film is heated by a laser beam and then cooled slowly.

FIG. 1 shows a typical equilibrium diagram of a binary alloy (A and B) obtained when no solid solution range is included. When the crystal structure of an alloy is different from those of each of two pure metals A and B and the free energy in the structure is relatively low over a composition range and a temperature range, an intermediate phase appears in the alloy. If an intermediate compound AmBn exists as a stable phase up to the melting point, the equilibrium diagram can be obtained by simply arranging a first two-element (A and AmBn) diagram and a second two-element (AmBn and B) diagram in parallel as shown in FIG. 1, when solid solution range appears. In FIG. 1, the vertical intermediate line AmBn represents an intermetallic compound. Further, L denotes a liquid phase and E denotes an eutectic line.

In the present invention, the optical memory is formed by a recording layer comprising as the main component an intermetallic compound. This indicates that the recording film is not necessarily formed of only the intermetallic compound or the intermediate phase compound AmBn, but rather formed of a mixture of the intermetallic compound AmBn and the pure metal A or B as depicted in FIG. 1. The allowable composition range from the intermediate phase line AmBn is about ±20%. Within this range, the properties of intermetallic compound are still maintained. Therefore, it should be noted that the optical memory according to the present invention implies a substance which includes an intermetallic compound more than 80% by volume percentage.

The above description can be derived from "Metal Data Book" by Japanese Metallography Society, Maruzen Co. "Introduction of Metallography" by Abe, Corona Co., and "Science of Glass Amorphous" by Sakuhana, Uchida Rokakuho Co. (1983). Therefore, these documents are incorporated herein by reference for further detail.

Figure 2:
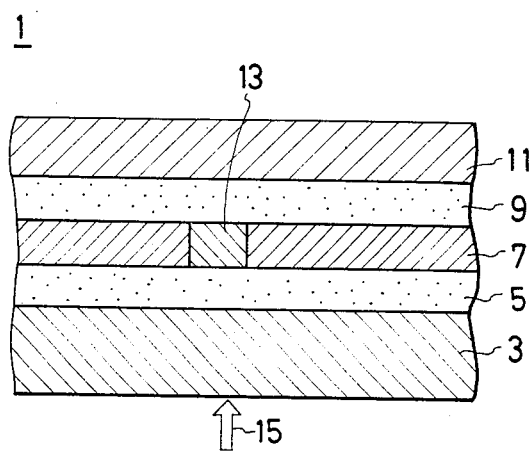
FIG. 2 is a structural example of the optical memory according to the present invention.

FIG. 2 shows a cross section of the optical memory of the present invention. In the drawing, an optical memory 1 is formed into a disk shape by arranging a substrate 3, a first protection film 5, a recording film 7, a second protection film 9 and an ultraviolet ray-hardened (UV) resin film 11 in this order as shown.

The substrate 3 is a transparent plate formed by acryl or polycarbonate resin or glass.

The first and second protection films 5 and 9 are formed by depositing $SiO_2$ to a thickness of 50 to 5000 Å (0.005 to 0.5 μm) in accordance with sputtering technique. By these protection films 5 and 9, the recording film 7 is prevented from being oxidized or from being bored in recording.

Further, the UV film 11 is formed by applying an UV resin on the second protection film 9 and by hardening it by ultraviolet rays. Owing to this UV film 11, the optical memory 1 is protected in use from mechanical damage such as scratches or cracks.

The recording film 7 is formed by depositing an intermetallic compound on the first protection film 5 to a thickness of 50 to 5000 Å (0.005 to 0.5 μm) in accordance with binary co-sputtering method.

Figure 3:
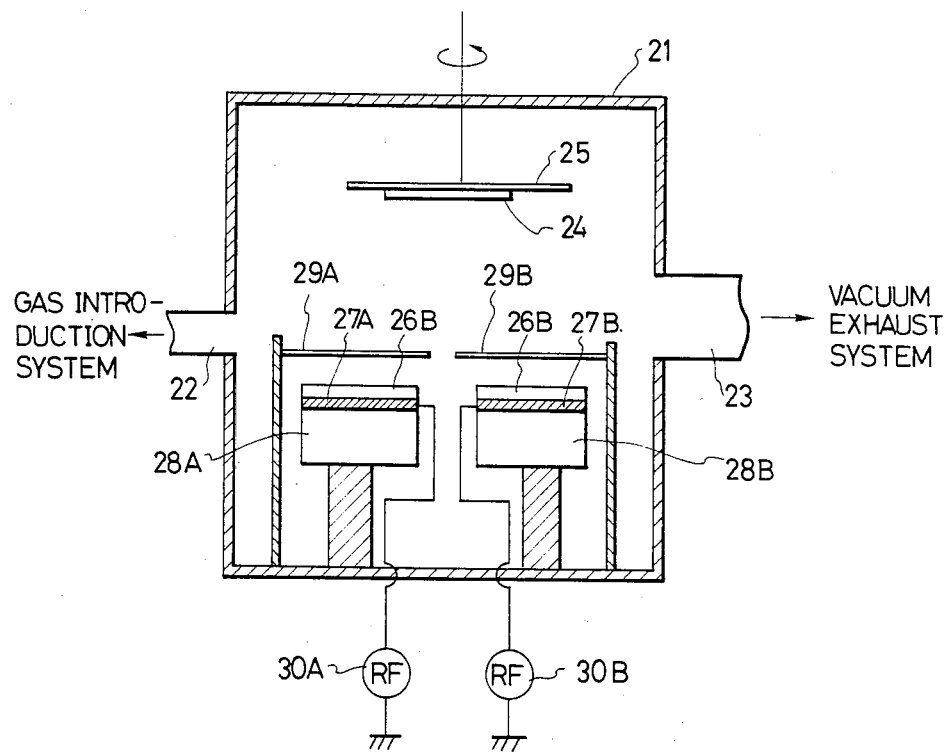
FIG. 3 is a diagrammetical view showing a two-target co-sputtering apparatus for assistance in explaining the method of forming an intermetallic compound film on a substrate.

FIG. 3 shows an example of the binary co-sputtering apparatus. In the drawing, a vessel 21 is connected to a gas introduction system through a gas duct 22 and to a vacuum exhaust system through an exhaust duct 23. A plurality of substrates 24 are arranged on a rotatable substrate holder 25. Two targets 26A and 26B are arranged on two electrodes 27A and 27B, separately. Each of the electrodes in supported by each electrode holder 28A or 28B. Two masks 29A and 29B are placed over the two targets 26A and 26B, separately, a distance away from each other. Each of two high frequency power sources 30A and 30B is connected to each of the electrodes 27A and 27B. Further the rotatable substrate holder 23 is ground.

In sputtering operation, gas ions generated by glow discharge are collided against the targets to emit target materials. The emitted target materials form a thin film on the substrates. By adjusting each of powers applied to the targets, it is possible to regulate the mixture ratio of two target materials.

EXAMPLE 1

The first protection film 5 was formed by depositing $SiO_2$ to a thickness of 1000 Å (0.1 μm) on an acryl resin substrate by sputtering method which uses a $SiO_2$ target.

Next, an $AuIn_2$ recording film 7 with a thickness of 2000 Å (0.2 μm) was formed on the first protection film 5 in accordance with the binary target co-sputtering technique, in which two Au and In targets were used simultaneously and the powers applied to the targets were adjusted.

A $SiO_2$ second protection film 9 with a thickness of 1000 Å (0.1 μm) was formed on the recording film 7 in the same method as in the first protection film 5. Further, an UV film 11 was formed by applying an UV resin on the second protection film 9 and hardening the resin by ultraviolet rays.

The recording film 7 formed as described above is in amorphous state. Therefore, the film 7 was crystallized into an equilibrium phase by continuously irradiating a 5 mW laser beam thereupon and slowly cooling it. Thereafter, the recording film 7 was changed into a non-equilibrium phase by irradiating a laser beam 15 of a 9 mW output and a 200 ns wide pulse including recording information and by quenching the film 7, in order that information was recorded to form a recorded bit portion 13.

EXAMPLE 2

The first protection film 5 was formed by depositing $SiO_2$ to a thickness of 1000 Å (0.1 μm) on an acryl resin substrate by sputtering method which uses a $SiO_2$ target.

Next, a $MgZn_2$ recording film 7 with a thickness of 1000 Å (0.1 μm) was formed an the first protection film 5 in accordance with the binary target co-sputtering technique, in which two Mg and Zn targets were used simultaneously and the powers applied to the targets were adjusted.

A $SiO_2$ second protection film 9 with a thickness of 1000 Å (0.1 μm) was formed on the recording film 7 in the same method as in the first protection film 5. Further, an UV film 11 was formed by applying an UV resin on the second protection film 9 and hardening the resin by ultraviolet rays.

The recording film 7 formed as described above is in amorphous state. Therefore, the film 7 was crystallized into an equilibrium phase by continuously irradiating a 5 mW laser beam thereupon and slowly cooling it. Thereafter, the recording film 7 was changed into a non-equilibrium phase by irradiating a laser beam 15 of a 9 mW output and a 200 ns wide pulse including recording information and by quenching the film 7, in order that information was recorded to form a recorded bit portion 13.

EXAMPLE 3

The first protection film 5 was formed by depositing $SiO_2$ to a thickness of 1000 Å (0.1 μm) on a acryl resin substrate by sputtering method which uses a $SiO_2$ target.

Next, a $CuGa_2$ recording film 7 with a thickness of 1000 Å (0.1 μm) was formed an the first protection film 5 in accordance with the binary target co-sputtering technique, in which two Cu and Ga targets were used simultaneously and the powers applied to the targets were adjusted.

A $SiO_2$ second protection film 9 with a thickness of 1000 Å (0.1 μm) was formed on the recording film 7 in the same method as in the first protection film 5. Further, an UV film 11 was formed by applying an UV resin on the second protection film 9 and hardening the resin by ultraviolet rays.

The recording film 7 formed as described above is in amorphous state. Therefore, the film 7 was crystallized into an equilibrium phase by continuously irradiating a 5 mW laser beam thereupon and slowly cooling it. Thereafter, the recording film 7 was changed into a non-equilibrium phase irradiating a laser beam 15 of a 9 mW output and a 200 ns wide pulse including recording information and by quenching the film 7, in order that information was recorded to form a recorded bit portion 13.

Figure 4:
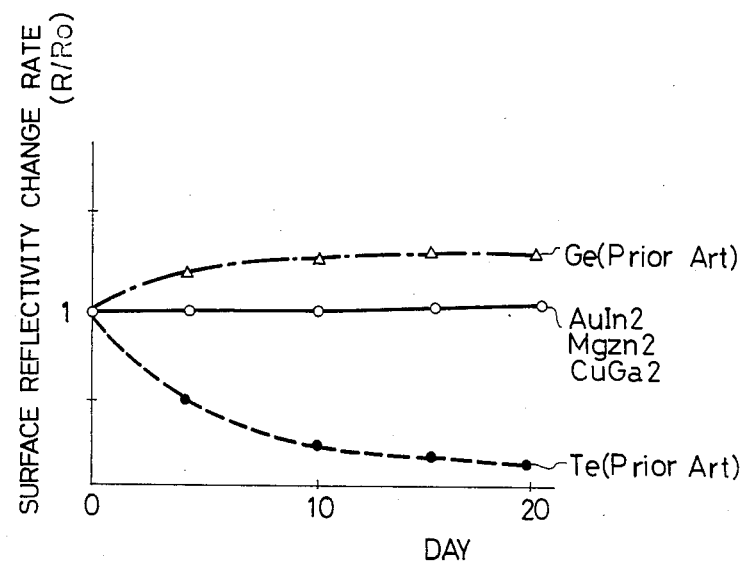
FIG. 4 is a graphical representation showing change rates of the surface reflectivity of the various optical memories with respect to a change with the passage of time for comparison between the memories of the present invention and the prior art memories.

FIG. 4 shows environment test results of these samples kept at a temperature of 60° C. and a relative humidity of 80 RH. The test results were shown by plotting the change rate R/Ro of surface reflectivity R to the original surface reflectivity Ro. The graph indicates that the change rate is almost constant even after 20 days and therefore the recording state is kept stable. Further, X-ray diffraction results indicated that the samples immediately after the film had been formed were in non-equilibrium phase and the samples after 20 days were also in non-equilibrium phase.

When comparing the prior-art recording films with those of the present invention, in the case of a conventional Te film, the R/Ro rate drops markedly from the beginning. Further, in the case of a Ge film, the R/Ro rate increased from the beginning and after 20 days it was found by an X-ray diffraction method that the Ge film was still kept in the non-equilibrium phase state; however, rust appeared over the film surface.

Further, in all the Examples, the recorded information was easily erased at high speed by irradiating a laser beam with about 2 mW output and a 2 us wide pulse upon the recorded bit portion 13 of amorphous state in order to heat the recording film 7 beyond the crystalization temperature and then cooling the film 7 slowly.

In the above description, a single-sided optical memory 1 has been described. However, without being limited to this, it is possible to apply the present invention to a double-sided optical memory by sticking two UV films of two single-sided optical memories to each other.

As described above, according to the invention, since the thin film in which information is recorded is formed by an intermetallic compound with a melting point of 300° to 800° C., the non-equilibrium portion at which information is recorded will not change into the equilibrium phase due to a change with the passage of time. Therefore, recorded information will not be erased naturally; that is, it is possible to provide a high reliable optical memory which can maintain the recorded state stably for a long period of time.

We claim:

1. An optical recording medium of phase transition type comprising:
   (a) a substrate; and
   (b) a recording layer supported on said substrate, said recording layer comprising more than 80% by volume of an intermetallic compound having one kind of crystalline structure in an intermediate solid phase with a melting point between 300° to 800° C. capable of undergoing phase-changing from an equilibrium phase to a non-equilibrium phase when said recording layer is heated by a laser beam and then quenched, and from a non-equilibrium phase to an equilibrium phase when said recording layer is heated by a laser beam and then cooled gradually.

2. The optical recording medium as set forth in claim 1, wherein said intermetallic compound has a normal valency compound selected from the group consisting of $AuSn$, $AuIn_2$, $InSb$, $BiTe$, $SnAs$ $CaSb$, and $GeTe$.

3. The optical recording medium as set forth in claim 1, wherein said intermetallic compound has a size factor compound selected from the group consisting of $AuPb_2$, $PdGa_5$, $KPb_2$, $Au_2Pb$, $KBi_2$, $MgZn_2$, $Mg_2Ba$, $Au_2Bi$, $Mg_2Sr$, $Mg_2Ca$, and $MuSn_2$.

4. The optical recording medium as set forth in claim 1, wherein said intermetallic compound has an electron compound selected from the group consisting of $MgTl_2$, $LiPb$, $CuGa_2$, $Cu_5Cd_8$, $MgHg$ and $AuZn$.

5. The optical recording medium as set forth in claim 1, wherein said recording material comprises an intermetallic compound more than 80% by volume percentage.

* * * * *